Patented July 11, 1939

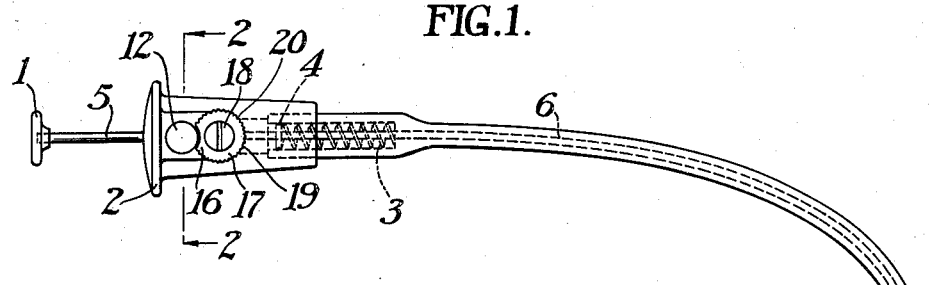
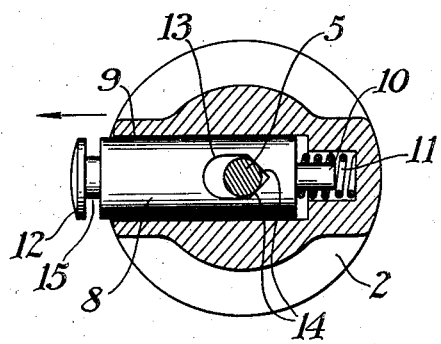
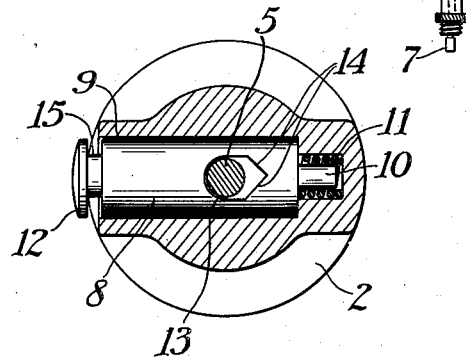
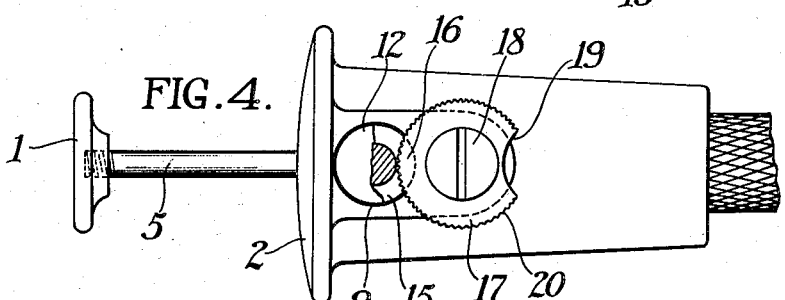
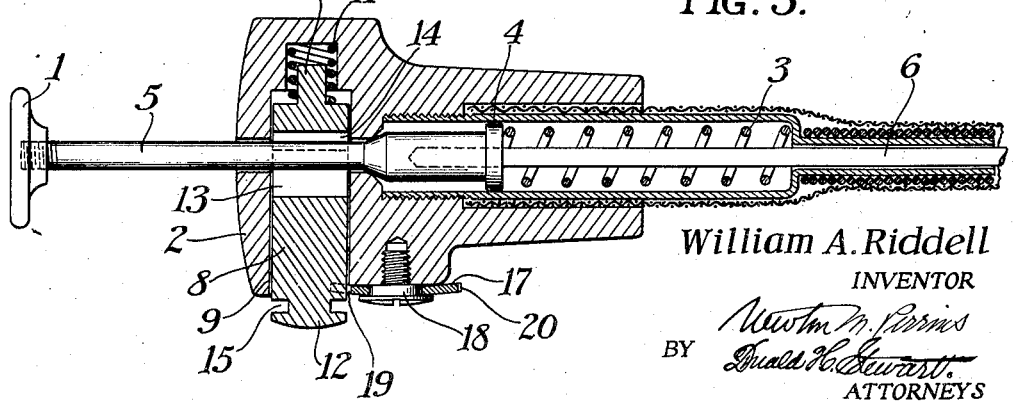
William A. Riddell
INVENTOR

2,165,414

UNITED STATES PATENT OFFICE 2,165,414

CABLE RELEASE FOR TIME EXPOSURES

William A. Riddell, Rochester, N. Y., assignor to Eastman Kodak Company, Rochester, N. Y., a corporation of New Jersey Application December 8, 1937, Serial No. 178,769

3 Claims. (Cl. 74—502)

This invention relates to photography and more particularly to cable releases adapted to actuate photographic shutters.

One object of my invention is to provide a cable release in which two finger grips may be pressed together to actuate a shutter and in which the thrust member of the cable release may be retained against a return movement automatically. Another object of my invention is to provide a finger release for a friction latching means for the cable release plunger. Another object of my invention is to provide a cable release with a friction latching means which can readily be rendered inoperative, if desired, and other objects will appear from the following specification, the novel features being particularly pointed out in the claims at the end thereof.

Coming now to the drawing wherein like reference characters denote like parts throughout:

Fig. 1 is a side elevation of a cable release constructed in accordance with and embodying a preferred form of my invention.

Fig. 2 is an enlarged fragmentary sectional view of one of the cable release grips taken on line 2—2 of Fig. 1 with the parts in a plunger engaging position.

Fig. 3 is a view similar to Fig. 2, but with the parts in position to permit normal actuation of the plunger.

Fig. 4 is an enlarged fragmentary elevation partially in section showing the disk latch for rendering the friction plunger latch inoperative.

Fig. 5 is an enlarged horizontal section through the cable release plunger shown in Fig. 1.

It has been customary for many years to operate camera shutters by means of a cable release to eliminate, as far as possible, shake which frequently results from too heavy or too sudden pressure on a shutter trigger.

Many of the more modern cameras are provided with double exposure prevention devices which are so constructed that the shutters can only be used for the so-called "bulb" exposures, that is, an exposure in which the trigger is depressed for opening the shutter and released for closing the shutter. Such shutters are not convenient to use where prolonged exposures are required, because the operator must manually hold the shutter open.

My present cable release is particularly directed for use with such cameras and shutters and is arranged so that when the finger grips are pressed together to open the shutter, they may remain in this position until manually released by an operator. If desired, the friction latch designed to hold the finger grips together can be readily rendered inoperative so that the cable release may be used in the standard manner when desired.

As indicated in Fig. 1, the cable release may consist of a pair of finger grips 1 and 2 which are normally spaced apart by means of a spring 3 which presses upon a shoulder 4 on a plunger 5 which may actuate the flexible thrust member 6 which terminates, in turn, in a ferrule 7 which is adapted to operate a shutter. As thus far described, the construction of the cable release may be of any well known type.

In accordance with my invention, I equip the finger grip 2 with a friction latching device. As indicated in Fig. 2 this device may consist of a plug 8 which is slidably mounted in an opening 9 and which terminates in an end 10 of reduced diameter about which a spring 11 is coiled to normally thrust the plug in the direction shown by the arrow. On the opposite end of the plug 8 there is a push button 12 for moving the plug against the action of the spring 11 to release the plunger 5. The plunger 5 passes through a slot 13 in the plug, this slot being elongated in form and having a pair of V-shaped shoulders 14 adapted to engage two portions of the periphery of the plunger 5 to frictionally hold the plunger in any set position. Thus, when an operator moves the finger grips 1 and 2 toward each other, the plunger 5 will be frictionally engaged by the V-shaped walls 14 and as the strength of the spring 11 is just sufficient to overcome the thrust on the plunger exerted by the spring 3, the finger grips 1 and 2 will remain in any set position. The action of the spring 3 and the spring 11 upon the plunger 5 is so light that it does not appreciably restrain manual movement of the two finger grips.

When the plunger is held by the plug 8 as shown in Fig. 2, the ferrule 7 will remain in contact with the shutter trigger and the shutter leaves will be held in an open position until the plunger 5 is released. This can be readily accomplished by pressing in upon the push button 12 slightly compressing the spring 11 as indicated in Fig. 3 and permitting the spring to again separate the finger grips 1 and 2. This, of course, causes the retraction of the plunger 5 and permits the shutter leaves to close.

Since the friction latch is only desirable when time exposures are to be made, I have provided a means for definitely rendering the friction latch inoperative. As indicated in Fig. 4, the plug 8 has a groove 15 extending around the push button 12, and this groove is so proportioned that when the plug 8 is in the position shown in Fig. 3, the groove lies substantially parallel to an edge 16 of a disk 17 rotatably mounted upon a stud 18 and preferably having an arcuate cut-out 19 in one edge. The disk may be knurled at 20 to facilitate its operation.

In order to render the plug 8 inoperative, the push button 12 is depressed and the disk 17 rotated by its knurling 20 until a portion of the disk 17 lies in the groove 15. Thus, the push button 12 will be held in the position shown in Fig. 3, in which the V-shaped walls 14 are held out of contact with the plunger 5. In this position the cable release may be operated in the usual manner and the spring 3 will always hold the finger grips 1 and 2 separated except at such times as when they may be pressed together by an operator to make an exposure.

Whenever a time exposure is to be made, the disk 17 may be turned by its knurling 20 until the arcuate cut-out 19 lies adjacent the plug 8 and a portion of the disk 17 no longer lies in the groove 15. This permits the spring 11 to immediately move the plug 8 outwardly into the position shown in Fig. 2 in which it frictionally engages the plunger 5.

What I claim is:

1. In a cable release, the combination with a pair of finger grips, a tubular member carried by one grip and a plunger carried by the other, a spring for holding the finger grips separated, a friction latch for the plunger carried by one finger grip and comprising a plug having an aperture therethrough encircling the plunger, said aperture being elongated and having V-shaped walls adapted to frictionally engage the plunger, a spring for holding the V-shaped walls in contact with the plunger of sufficient strength to overcome the thrust of the plunger spring upon the plunger, but of insufficient strength to materially retard the manual operation of the plunger, said plug extending laterally of the finger grip supporting the friction latch for releasing the friction latch.

2. In a cable release, the combination with a pair of finger grips, a tubular member carried by one grip and a plunger carried by the other, a spring for holding the finger grips separated, a friction latch for the plunger carried by one finger grip and comprising a plug having an aperture therethrough encircling the plunger, said aperture being elongated and having V-shaped walls adapted to frictionally engage the plunger, a spring for holding the V-shaped walls in contact with the plunger of sufficient strength to overcome the thrust of the plunger spring upon the plunger, but of insufficient strength to materially retard the manual operation of the plunger, said plug extending laterally of the finger grip supporting the friction latch for releasing the friction latch and a disk pivotally mounted adjacent the plug having a cut-out and adapted to be turned to hold the plug against its spring and thereby render the V-shaped walls inoperative and to be turned to release the plug when said cut-out is brought into alinement therewith, whereby the V-shaped walls may be rendered operative by the plug spring.

3. In a cable release, the combination with a pair of finger grips, a tubular member carried by one grip and a plunger carried by the other, a spring for holding the finger grips separated, a friction latch for the plunger carried by one finger grip and comprising a plug having an aperture therethrough encircling the plunger, said aperture being elongated and having V-shaped walls adapted to frictionally engage the plunger, a spring for holding the V-shaped walls of said plug in frictional contact with the plunger of sufficient strength to overcome the force exerted on the plunger by the plunger spring, but of insufficient strength to materially retard the manual operation of the plunger, said plug extending laterally of the finger grip supporting the friction latch for releasing the friction latch and a disk pivotally mounted adjacent the plug having an arcuate cut-out therein, said disk when the arcuate cut-out is positioned permitting free movement of the plug past the disk and when turned to move the arcuate cut-out away from the plug being adapted to extend over a portion of the depressed plug to latch the same against movement.

WILLIAM A. RIDDELL.